United States Patent [19]
Vogel

[11] 3,988,755
[45] Oct. 26, 1976

[54] SAFETY INSULATOR FOR DISCARDED CAMERA FILM AND BATTERY PACK

[75] Inventor: Arthur E. Vogel, Columbus, Ohio

[73] Assignee: S. Noel Melvin, Columbus, Ohio ; a part Interest

[22] Filed: Sept. 25, 1975

[21] Appl. No.: 616,853

[52] U.S. Cl. .............................. 354/275; 339/40; 354/83; 354/174; 354/202
[51] Int. Cl.² .................................... G03B 17/26
[58] Field of Search ..................... 354/275–278, 354/83, 174, 202; 352/78; 339/36, 40

[56] References Cited
UNITED STATES PATENTS

| | | | |
|---|---|---|---|
| 2,477,803 | 8/1949 | Huber | 339/40 |
| 3,543,662 | 12/1970 | Erlichman | 354/202 |
| 3,561,339 | 2/1971 | Erlichman | 354/83 X |
| 3,705,537 | 12/1972 | Paglia | 354/202 |
| 3,865,456 | 2/1975 | Dola | 339/40 |
| 3,877,045 | 4/1975 | Bloom et al. | 354/275 |

Primary Examiner—R. L. Moses
Attorney, Agent, or Firm—William V. Miller

[57] ABSTRACT

A film and battery pack provided with means for insulating one or both of the poles of the battery in a combination film and battery pack used in a camera of the instant-developing type. The insulating means is ineffective before and after insertion into the pocket of the camera which receives the pack but is moved into insulating relationship to the poles of the battery of the pack as the pack is removed from the camera for discarding.

13 Claims, 11 Drawing Figures

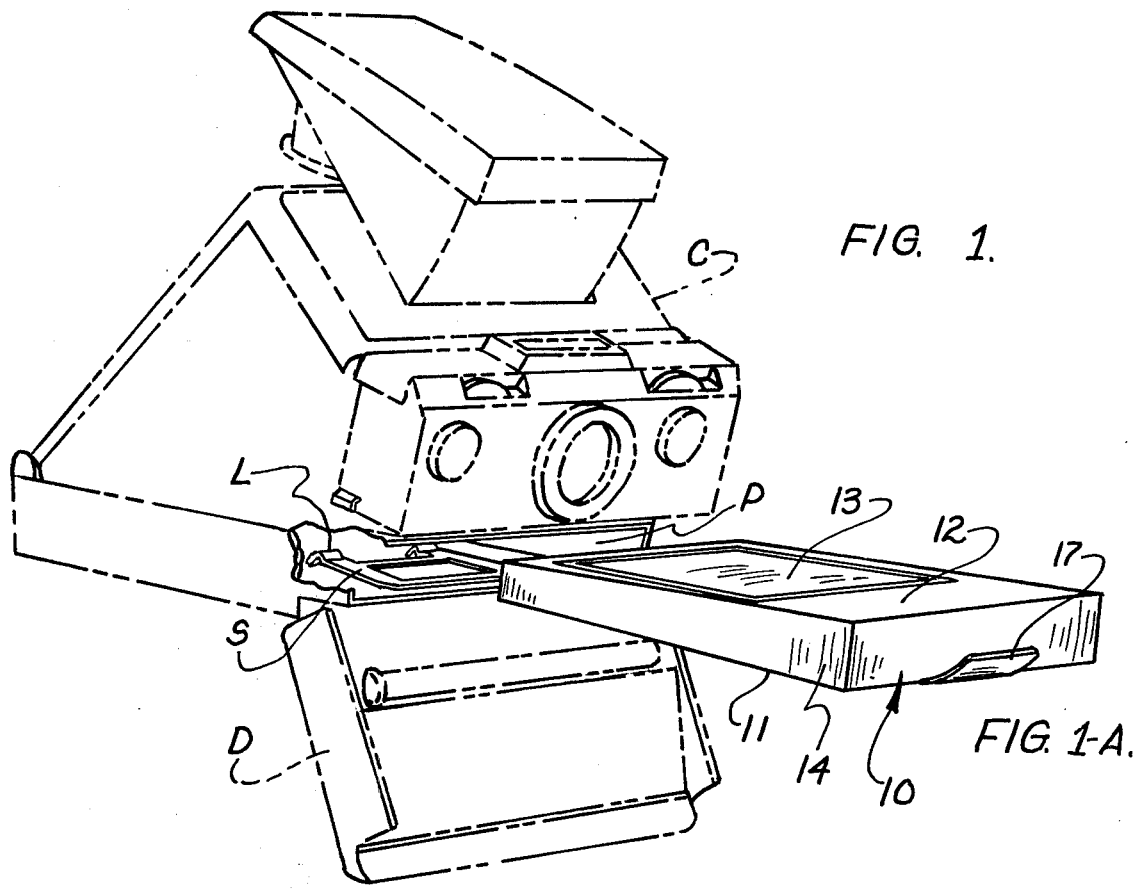
FIG. 1.
FIG. 1-A.
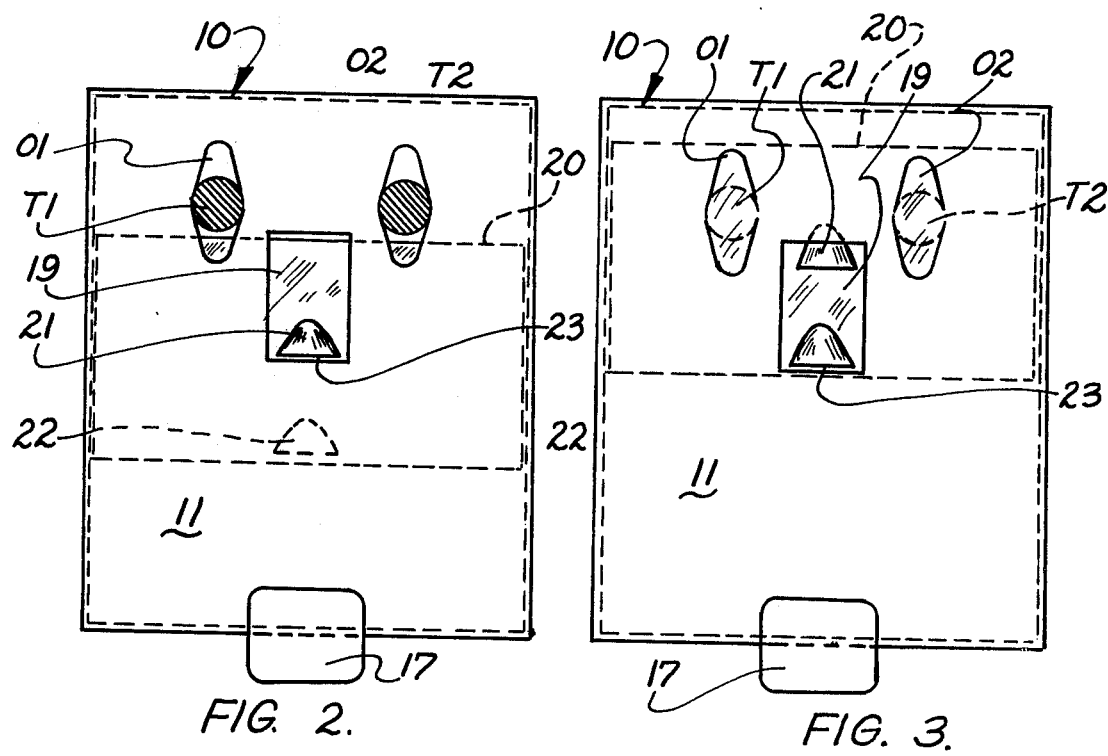
FIG. 2.
FIG. 3.

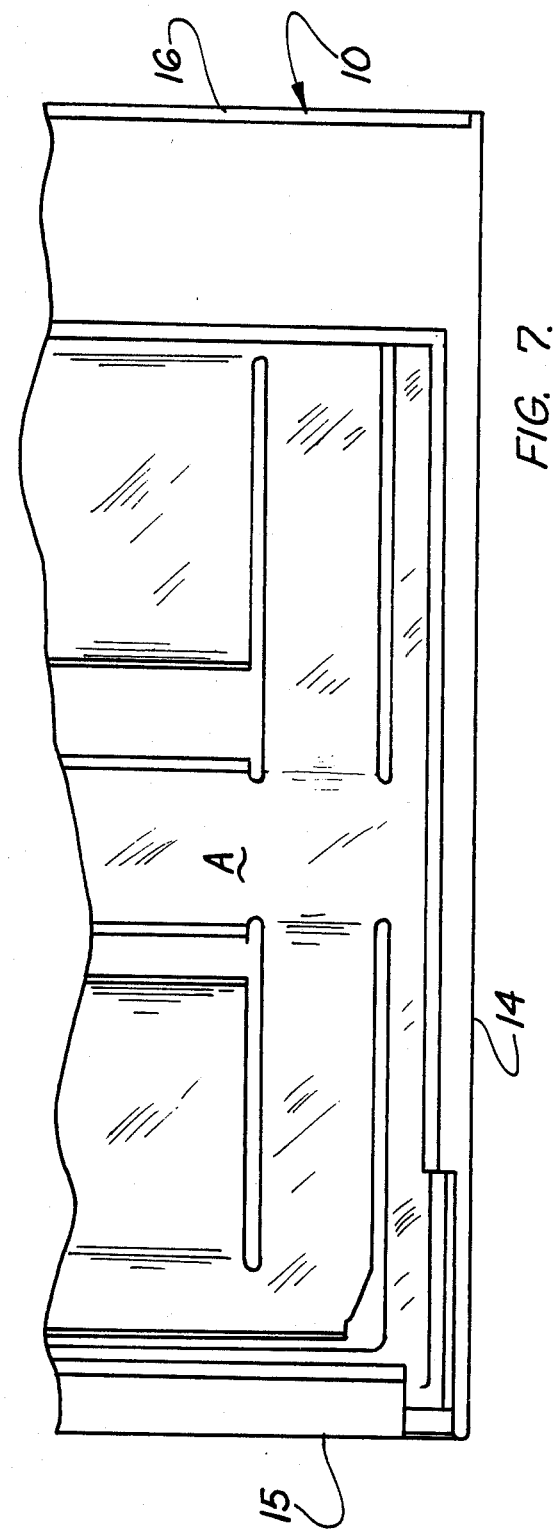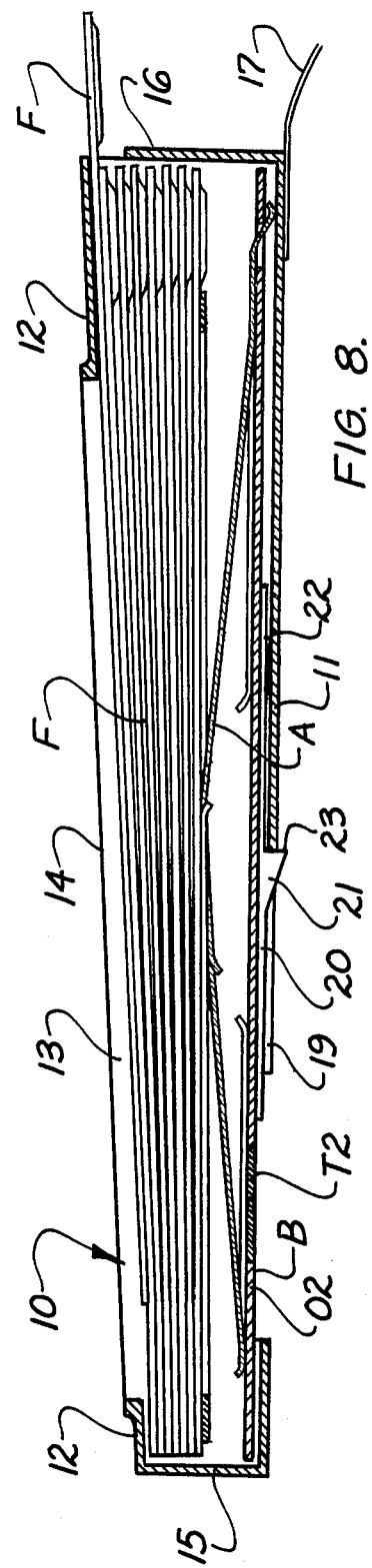

SAFETY INSULATOR FOR DISCARDED CAMERA FILM AND BATTERY PACK

BACKGROUND OF THE INVENTION

A popular camera on the market at present is known as the "SX70" and is manufactured and sold by the Polaroid Corporation. This is an automatic instant-developing camera which uses a combination film and battery pack which will hereafter be referred to as the film pack. This pack includes a battery to supply power for operating the camera and in its bottom wall has openings which expose the two poles of the battery, so that when the pack is slipped into the camera, contact is made with these poles to provide a power circuit for the camera.

When the spent film pack is withdrawn from the camera and discarded, there is the danger of some material contacting the exposed battery terminals to short them and possibly resulting in a fire. This, has been observed in an actual experience where the film pack was discarded in a wastebasket and a discarded sandwich wrapper of metal foil contacted the two terminals and started a fire.

SUMMARY OF THE INVENTION

The present invention provides a film pack for a camera of the type indicated which is equipped with insulating means that normally is in a position to uncover the poles of the battery of the pack. When the pack is inserted in the camera, the poles make contact in the usual manner. However, means is provided in the pack for cooperating with the camera so that the mere withdrawal of the pack from the camera results in moving the insulating means over at least one of the battery terminals. Therefore, when the film pack is discarded there is no possibility of shorting the two contacts of the battery and thereby accidentally starting a fire.

BRIEF DESCRIPTION OF THE DRAWINGS

The best mode contemplated in carrying out this invention is illustrated in the accompanying drawings in which:

FIG. 1 is a phantom isometric view of an automatic camera of the instant-developing type with the film-loading door open to receive the modified film pack of this invention which cooperates with the camera.

FIG. 1A is a perspective view of the film pack of this invention just prior to insertion into the camera of FIG. 1.

FIG. 2 is a bottom view of the modified film pack showing the safety insulating strip in the pack in its original position within the pack where it does not cover the poles of the battery in the pack.

FIG. 3 is a view similar to FIG. 2 but showing the insulating strip after it has been moved to covering relationship to the poles of the battery which occurs by cooperation of the modified pack and the camera as the pack is slipped from the camera for discarding.

FIG. 4A is a side elevational view of the modified film pack before it is inserted into the camera.

FIG. 4B is a view similar to FIG. 4 but showing the film pack inserted in the camera.

FIG. 7 is a partial plan view of a film pack modified according to this invention, showing the film removed so as to show the usual pressure spring of the pack.

FIG. 8 is a longitudinal sectional view taken through the film pack modified according to this invention, showing the uppermost film pulled out slightly.

DETAILED DESCRIPTION OF THE INVENTION

Figure 5:
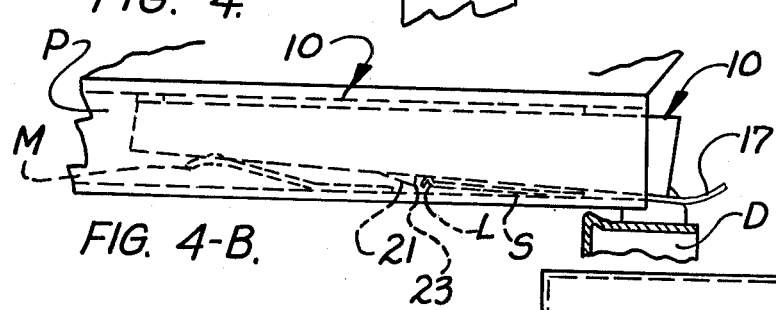
FIG. 5 is a plan view of the unmodified film and battery pack as it is at present provided for use in the camera.
Figure 5:
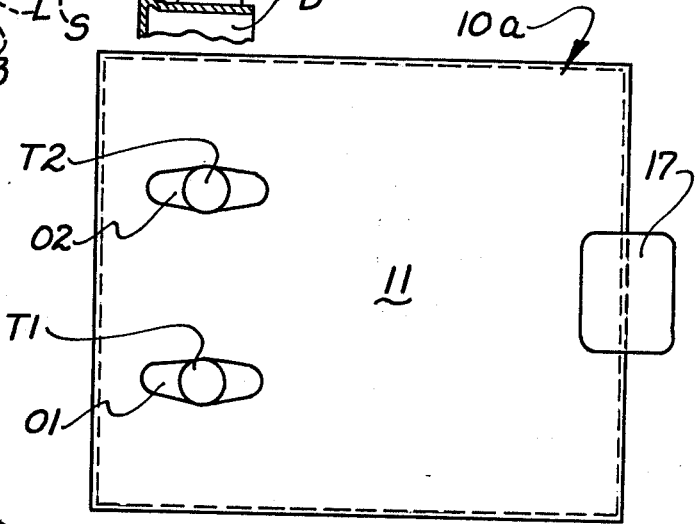

With reference to FIG. 1, there is shown an automatic camera C of an instant-developing type which is the SX70 previously mentioned, but it is to be understood that the invention is also applicable to other models. Most of the camera is indicated by broken lines, the camera being shown in its expanded condition with the film-loading door D swung downwardly into open position to expose the film pack receiving pocket P. Within this pocket P on the lower wall thereof is a pressure spring in the form of a leaf spring S which has a shoulder or lug L at its inner end. This spring is midway of the sides of the pocket P and is provided in the camera to retain the film pack by friction when it is inserted in the pocket P. In the pocket inwardly of the spring S, the usual battery contact spring means M is shown, which is in the form of two laterally spaced contact springs. The standard film pack which is now used in this camera is illustrated in FIG. 5 and is designated generally by the numeral 10a. For the purposes of this invention, the standard film pack is modified and this modified film pack is designated 10 in the drawings.

The standard film pack 10a and the modified film pack 10 of this invention is a cartridge or case generally of wedge shape having a flat bottom wall 11, an inclined upper wall 12, with a window 13 therein to expose the film, and connecting vertical sidewalls 14 of tapering form with a forward vertical end wall 15 and a rear vertical end wall 16 which is of greater extent. The film pack is wedge-shaped to accommodate the stack of film F which are thicker at one end because of a capsule E for the developer at that end of each film. At the rear lower corner of the pack is a pull tab 17 by means of which the film pack may be pulled from the pocket P of the camera. The standard pack and the modified pack each has the film disposed therein as laminations and a pressure spring A shown best in FIGS. 7 and 8, is also provided therein between the battery B on the bottom wall 11 and the lowermost film F. This spring A serves to press the film F upwardly into association with the window 13, as they are successively exposed, and the battery B downwardly flat against the wall 11, since the standard and the modified film pack has the battery B disposed between the lowermost film F and the bottom wall 11, as shown best in FIG. 8. This battery has terminals T1 and T2 which are exposed through associated elongated substantially oval-shaped openings O1 and O2 formed in the bottom wall.

According to this invention, the only modifications made in the standard film pack is the provision of an opening 19 in a predetermined location in the bottom wall 11 and the positioning of an insulating means 20 therein, with the resulting modified film pack 10 appearing as in the drawings. The opening 19 (FIGS. 2 and 3) is shown as being of elongated rectangular form extending longitudinally of the wall 11 at the longitudinal center line thereof, with its forward or outer end disposed between the adjacent inner ends of the elongated openings O1 and O2. Thus, there is no change in the standard film pack itself except that the opening 19 is formed therein. However, in addition to the change in the film pack, the insulating means 20 is mounted within the pack for insulating the battery terminals T1 and T2 as the film pack is withdrawn from the camera.

Figure 6:
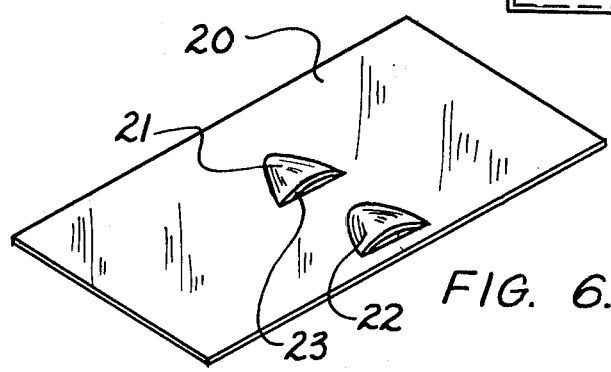
FIG. 6 is an isometric view of the insulation strip before it is positioned in the film pack.

This insulating means 20 is shown in FIG. 6 as comprising an element in the form of an insulating sheet or strip. This strip may be made of various insulating materials, but is preferably of a thermoplastic material. Locking protuberances or lugs 21 and 22 are pressed out at the centerline of the strip 20, the leading one 21 being spaced slightly from the forward edge of the strip and the trailing one 22 being adjacent the rear edge of the strip, both having blunt rear locking edges or shoulders 23. These protuberances will be resilient and can be pressed flat into the plane of the strip by contact with their leading inclined cam-like ends. The strip 20 is preferably of rectangular form with its greater dimension such that when transversely disposed it will just fit into the film pack or cartridge and be guided by the sidewalls 14 thereof. The strip is positioned in the film pack between the battery B and the bottom wall 11 so that it can slide longitudinally therebetween. Originally it is disposed longitudinally as shown in FIGS. 2 and 8 with its forward edge just behind the terminals T1 and T2, with the spring locking protuberance 21 projecting through the opening 11 and adjacent the rear end thereof, and with the locking protuberance 22 inwardly of the opening and flattened against the inner surface of the bottom wall 11.

Figure 4:
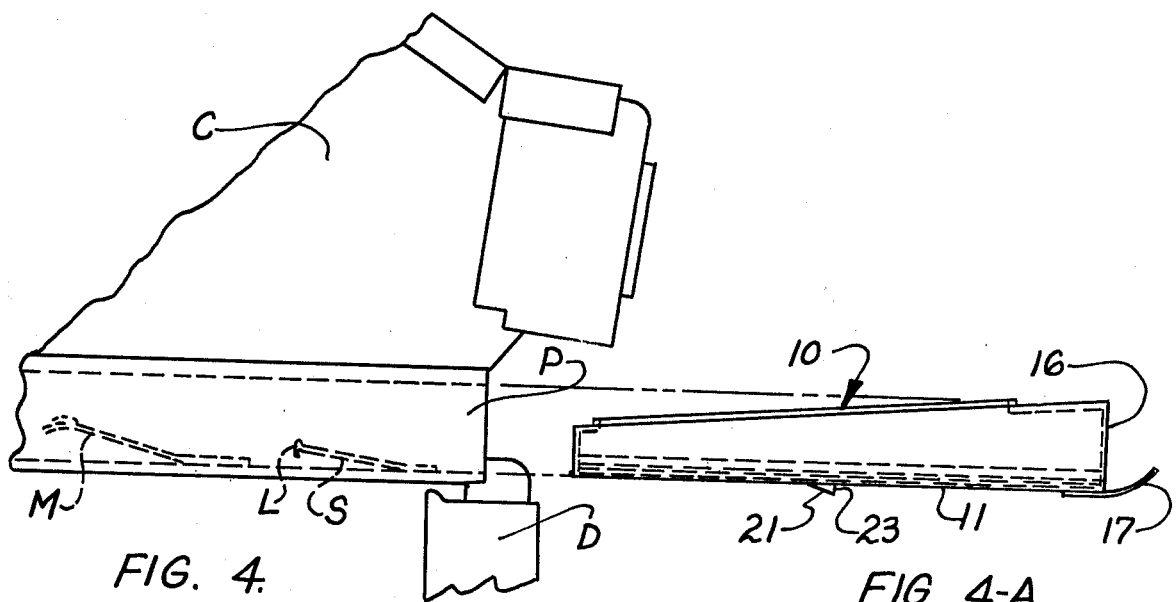
FIG. 4 is a side view of a portion of the camera.

Each film pack inserted in the camera has a new battery B therein. The modified film pack 10 will be inserted from the position indicated in FIGS. 1-1A and 4-4A, and as it nears its final position shown in FIG. 4B, the shoulder L will snap into the opening 19 of the pack to engage the shoulder 23 of the lug 21 and the insulating strip 20. As shown in FIG. 4B, when the pack 10 is inserted in pocket P of the camera, it is tilted by springs S and M so that its upper wall is horizontal. As indicated in FIG. 2, the lug 21 will usually project through the opening 19, but as the film pack or cartridge is inserted into the pocket P, it will be flattened and the spring shoulder L will snap into engagement with the shoulder 23 thereof as indicated in FIG. 4B. At this time, the insulating strip 20 will be in its initial position within the film pack and will not cover the contacts T1 and T2 so they can supply power to the camera operating mechanism through contact spring means M. However, as soon as the film pack 10 is pulled out of the pocket P by means of the tab 17, the insulating strip 20 will be moved over the openings O1 and O2 to cover the battery terminals T1 and T2. This movement of the strip 20 to insulating position, within the pack, is caused by the spring shoulder L being in engagement with the edge 23 of lug 21, so that movement of the strip relative to the pocket P will be delayed, as the film pack is bodily slipped out of the pocket and thus there will be a relative sliding of the battery B and strip 20 until the strip is moved within the film pack to a position where the terminals T1 and T2 are covered. As the film pack is slipped from pocket P, the insulating strip 20 will be moved from the position shown in FIG. 2 to the position shown in FIG. 3. As withdrawal of the film pack 10 is completed, the spring locking shoulder L is released from the straight edge 23 of the lug 21 by contact with wall 11 at the inner end of opening 19 and at the same time the forward inclined end of lug 21 has passed beyond the forward or inner end of the opening 19 and has been flattened by the wall 11. Also, the lug 22 will snap downwardly into the opening 19 as it moves over the opening, and its straight shoulder 23 will cooperate with the rear edge of the opening 19, as indicated in FIG. 3, to lock the insulating strip 20 in its battery-insulating position.

Thus, as the film pack is withdrawn, the insulating means is moved to insulating position relative to the battery. It has been found, in actual practice, that each fresh battery B in the film pack has sufficient power to activate the electric motor in the camera to eject the ten films in the pack, and operate the ten flash bulbs on the camera and still have a remaining charge sufficient to operate the camera thirty or forty more cycles. This potential electrical energy available, at the battery contact buttons or terminals T1 and T2, can readily start a fire if these two terminals contact an electrical conductor, but this is effectively prevented by this invention. The terminals are insulated automatically upon withdrawal of the film pack, by this invention, which provides insulating means in the modified film pack cooperating with the shoulder of the standard pack-retaining spring provided on the camera. The standard film pack need only be modified slightly by forming the opening in its bottom wall and slidably mounting the insulating strip within the bottom wall.

Having thus described the invention, what is claimed is:

1. In combination with an automatic camera having a pocket for receiving a film pack,
   a film pack comprising a housing having film and an electric battery therein, said battery having terminals which are exposed at associated openings in said housing, insulating means inwardly mounted in cooperation with the terminals for movement from a normal non-insulating position to an insulating position relative to the terminals, and means on the camera for engaging the insulating means as the film pack is withdrawn from the pocket to move it into insulating position relative to the terminals.

2. The combination of claim 1 in which:
   said insulating means is a member mounted within the housing for movement from its non-insulating position where it does not cover the terminals to its insulating position where it covers at least one of the terminals and closes the associated opening, and said engaging means is carried by the camera in position to project through an opening in said housing where it engages said insulating member to produce the movement thereof into insulating position in the film pack as the pack is withdrawn from the camera pocket.

3. In combination with an automatic camera having a pocket for receiving a film pack,
   a film pack comprising a housing having laminations of film and an electric battery with an exterior wall against which the battery rests, said battery having a pair of terminals which are exposed by a pair of associated openings in said wall, insulating means movably mounted relative to the housing for movement into insulating position to cover at least one of said terminals, and means on said camera for moving said insulating means to insulating position as the film pack is withdrawn from said pocket.

4. The combination of claim 3 in which:

said insulating means is a strip of insulating material mounted for sliding movement between said battery and said exterior wall, said moving means comprises a strip-engaging member and said exterior wall has an actuating opening through which said member projects when the film pack is inserted in said pocket for causing sliding movement of said strip into an insulating position where it covers at least one of said terminals and its associated opening as the pack is withdrawn from the pocket.

5. The combination of claim 4 in which:

said insulating strip has a pair of compressible resilient cam-shoulders which are spaced in the direction of sliding movement thereof, said actuating opening in the exterior wall comprising a slot extending in the direction of sliding movement of said strip, said cam shoulders being so spaced relative to said slot that when one projects through the slot the other is at least partially beyond the adjacent end of the slot.

6. The combination of claim 5 in which:

said strip is a plastic insulating material and said shoulders are formed as protuberances on the lower surface thereof adjacent said exterior wall, which is the bottom wall of said film pack housing, each of said protuberances having a leading inclined cam surface and a trailing blunt shoulder, and said actuating member is a spring carried on the lower wall of said pocket which as a lip projecting through said slot to engage the shoulder on the trailing protuberance, the shoulder on the trailing protuberance cooperating with the trailing end of the slot as the strip is moved to insulating position.

7. A film pack for an automatic camera comprising a housing with film and an electric battery therein, said battery having terminals which are exposed at associated openings in said housing, and insulating means movably mounted in cooperation with the terminals for movement from a normal non-insulating position to an insulating position relative to the terminals.

8. The combination of claim 7 in which:

said insulating means is a member mounted within the housing for movement from its non-insulating position where it does not cover the terminals to its insulating position where it covers at least one of the terminals and closes the associated opening.

9. A film pack for an automatic camera which comprises a housing having laminations of film and an electric battery with an exterior wall against which the battery rests, said battery having a pair of terminals which align with a pair of openings in said wall, and insulating means movably mounted relative to the housing for movement into insulating position to cover at least one of said terminals.

10. The combination of claim 9 in which:

said insulating means is a strip of insulating material mounted for sliding movement between said battery and said exterior wall, said exterior wall having an actuating opening through which the strip can be engaged to produce said sliding movement.

11. The combination of claim 10 in which:

said insulating strip has a pair of compressible resilient shoulders which are spaced in the direction of sliding movement thereof, said actuating opening in the exterior wall comprising a slot extending in the direction of sliding movement of said strip, said cam shoulders being so spaced relative to said slot that when one projects through the slot the other is a least partially beyond the adjacent end of the slot.

12. The combination of claim 11 in which:

said strip is a plastic insulating material, said shoulders are formed as protuberances on the lower surface thereof adjacent said exterior wall of said film pack housing and each of said protuberances has a leading inclined cam surface and a trailing blunt shoulder.

13. The method of insulating the exposed poles of a battery in a film pack which as been positioned in a pocket of an automatic camera and is to be withdrawn therefrom, which comprises providing a movable insulating means in cooperation with the battery terminals for movement from a normal non-insulating position to an insulating position relative to the terminals, and engaging the insulating means by a part of the camera as the film pack is withdrawn to move it into insulating position relative to the terminals.

* * * * *